United States Patent
Nuber et al.

(10) Patent No.: US 10,166,965 B2
(45) Date of Patent: Jan. 1, 2019

(54) METHOD FOR SELECTING A MODE OF OPERATION OF A HYBRID VEHICLE

(71) Applicant: MAN TRUCK & BUS AG, München (DE)

(72) Inventors: Johannes Nuber, Karlsfeld (DE); Elmar Kirchensteiner, Vierkirchen (DE); Manuel Günnewicht, Pliening (DE); Matthias Hierlmeier, München (DE); Sebastian Ovari, Hebertshausen (DE)

(73) Assignee: MAN Truck & Bus AG, Munich (DE)

( * ) Notice: Subject to any disclaimer, the term of this patent is extended or adjusted under 35 U.S.C. 154(b) by 134 days.

(21) Appl. No.: 15/162,031

(22) Filed: May 23, 2016

(65) Prior Publication Data
US 2016/0339904 A1    Nov. 24, 2016

(30) Foreign Application Priority Data
May 22, 2015    (DE) .......................... 10 2015 006 820

(51) Int. Cl.
  *B60W 20/15*  (2016.01)
  *B60W 50/00*  (2006.01)
  (Continued)

(52) U.S. Cl.
  CPC ............ *B60W 10/08* (2013.01); *B60W 10/06* (2013.01); *B60W 20/10* (2013.01); *B60W 20/11* (2016.01);
  (Continued)

(58) Field of Classification Search
  None
  See application file for complete search history.

(56) References Cited

U.S. PATENT DOCUMENTS

| | | | |
|---|---|---|---|
| 2011/0130901 A1 | 6/2011 | Mori et al. | |
| 2015/0051775 A1 | 2/2015 | Gotoh et al. | |
| 2015/0360678 A1 | 12/2015 | Le Roy et al. | |

FOREIGN PATENT DOCUMENTS

| | | |
|---|---|---|
| DE | 102007019989 | 10/2008 |
| DE | 102008042781 | 4/2010 |

(Continued)

OTHER PUBLICATIONS

A. Wilde, "Eine modulare Funktionsarchitektur für adaptives und vorausschauendes Energiemanagement in Hybridfahr-zeugen", dissertation, TU Munich, 2009, English machine translation, sent with our e-mail dated May 30, 2016.

(Continued)

*Primary Examiner* — Mussa A Shaawat
*Assistant Examiner* — Kyung J Kim
(74) *Attorney, Agent, or Firm* — Cozen O'Connor

(57) ABSTRACT

A method for selecting a mode of operation of a hybrid vehicle. At least one evaluation variable is determined for each predetermined target criteria for the quantitative description of the respective target criterion. Possible power distributions in the drivetrain are determined for each mode of operation of a first selection of possible modes of operation; determining values of the evaluation variables for each one of the determined power distributions of the respective mode of operation for each mode of operation of the first selection and determining an ideal power distribution in the drivetrain by the determined values of the evaluation variables for the respective mode of operation; and selecting an ideal mode of operation by those values of the evaluation variables which the latter have for the modes of operation of the first selection, in each case at the operating point of the determined ideal power distribution.

13 Claims, 8 Drawing Sheets

(51) Int. Cl.
  *B60W 10/08* (2006.01)
  *B60W 30/182* (2012.01)
  *B60W 10/06* (2006.01)
  *B60W 20/10* (2016.01)
  *B60W 20/11* (2016.01)

(52) U.S. Cl.
  CPC ... *B60W 30/182* (2013.01); *B60W 2710/0677* (2013.01); *B60W 2710/083* (2013.01); *B60W 2710/086* (2013.01); *Y02T 10/56* (2013.01); *Y02T 10/6286* (2013.01); *Y02T 10/84* (2013.01); *Y10S 903/93* (2013.01)

(56) References Cited

FOREIGN PATENT DOCUMENTS

| | | |
|---|---|---|
| DE | 102010008695 | 8/2011 |
| FR | 2935123 | 2/2010 |
| FR | 3001427 | 8/2014 |

OTHER PUBLICATIONS

J. von Grundherr, "Ableitung einer heuristischen Be-triebsstrategie für ein Hybridfahrzeug aus einer Online-Optimierung", dissertation, TU Munich, 2010, English ma-chine translation, sent with our e-mail dated May 30, 2016.

Onori et al., "Adaptive Equivalent Consumption Minimization Strategy for Hybrid Electric Vehicles", Proceedings of the ASME 2010, Dynamic Systems and Control Conference DSCC2010 Sep. 12-15, 2010, Cambridge (MA), USA.

Search Report dated Nov. 11, 2016 which issued in the corresponding European Patent Application No. 16000919.7.

METHOD FOR SELECTING A MODE OF OPERATION OF A HYBRID VEHICLE

BACKGROUND OF THE INVENTION

1. Field of the Invention

The invention relates to a method for selecting an operation mode of a hybrid vehicle, in particular to selecting a method in which a mode of operation, ideal for the current (present) operation with respect to predetermined target criteria, with a corresponding ideal power distribution in the drivetrain from a predetermined set of possible modes of operation of a hybridized drivetrain.

2. Description of the Related Art

Constantly increasing fuel costs and stricter legal requirements in relation to the vehicle emissions place ever higher demands on the efficiency of motor vehicles. The hybridization of the drivetrain constitutes a great potential for reducing the fuel consumption. Here, the drivetrain is complemented by at least one electric machine and an assigned electric storage system.

Various techniques and methods are known from the prior art for selecting a mode of operation within the scope of an operational strategy. In this respect, reference is made, in an exemplary manner, to the following publications from the prior art:

[1]: A. Wilde, Eine modulare Funktionsarchitektur für adaptives and vorausschauendes Energiemanagement in Hybridfahrzeugen, dissertation, TU Munich, 2009; and

[2]: J. von Grundherr, Ableitung einer heuristischen Betriebsstrategie für ein Hybridfahrzeug aus einer Online-Optimierung, dissertation, TU Munich, 2010; and

[3]: Onori et al., Adaptive Equivalent Consumption Minimization Strategy for Hybrid Electric Vehicles, Proceedings of the ASME 2010, Dynamic Systems and Control Conference DSCC2010 Sep. 12-15, 2010, Cambridge (Mass.), USA.

In accordance with the publication [1], page 19ff., the various techniques and methods for setting an operational strategy for a hybridized drivetrain can be classified as follows:

In accordance with so-called offline or static operational strategy, all use cases of the vehicle are already set in advance and offline based on fixed prescriptions, according to which the energy management in the vehicle is set. By way of example, such prescriptions or rules can be implemented by state machines or continuous controllers.

Furthermore, ideal controls that incorporate a projection horizon into the optimization problem (also referred to as model predictive control (MPC)) are known. Based on the input information, such approaches establish an ideal trajectory of a state variable of the system, for example the charge state of the energy store, in a certain advance window (prediction horizon) in a predetermined search space for the considered model.

Furthermore, AI method-based operational strategies for controlling the energy systems in the hybrid vehicle are known. Here, an attempt is made to represent ill-defined knowledge with the aid of mathematical methods, such as neural networks, fuzzy logic, economic models, or approaches from game theory, in such a way that computer systems are able to process the ill-defined knowledge.

Finally, methods based on so-called online optimizations, which understand the vehicle to be a multidimensional optimization problem described by at target function incorporate not only physical variables such as consumption but also other requirements such as noise emission or the service life protection of components, etc., are known. By way of example, publication [2] proposes an overall cost function, by which further target criteria such as drivability (travel comfort) are considered in addition to the "fuel efficiency" target criterion. Here, partial cost functions corresponding to the individual target criteria are combined as an overall cost function by means of a summation and then the decision in relation to the operational strategy is calculated from the overall cost function.

However, a disadvantage of the known approaches is that the optimization approaches based on such a combined overall cost function require high computational outlay and are often unsuitable for real-time operation in view of the limits of the computational capacity of current controllers. Furthermore, these approaches are disadvantageous in that the optimization methods generally cannot be adapted to further or amended target criteria with little adaptation outlay as there are interactions between the individual target criteria and an addition of further partial cost functions generally necessitates complex changes in the analytic equation of the overall cost function.

SUMMARY OF THE INVENTION

The degree of hybridization allows various further modes of operation, such as electric travel, a boost operation, brake recuperation, etc., to be represented in addition to a pure combustion-engine-related operation. The various modes of operation of a hybridized drivetrain must be used expediently during vehicle operation in order to achieve the greatest possible reduction in the fuel consumption. In so doing, further targets should also be considered since the increase of the consumption efficiency always takes place between the conflicting priorities of emission minimization, component protection and/or travel comfort. Therefore, in order to realize an ideal operational strategy of the hybrid vehicle, it is necessary to select a mode of operation, ideal for the current instant of operation in respect of predetermined target criteria, with a corresponding ideal power distribution in the drivetrain from a predetermined set of possible modes of operation of the hybridized drivetrain.

An object of one aspect of the invention is to provide an improved method for selecting a mode of operation of a hybrid vehicle, by which disadvantages of conventional techniques can be avoided. In particular, an object of the invention is to provide a method for selecting a mode of operation of a hybrid vehicle, in which a mode of operation ideal for the current instant of operation with respect to predetermined target criteria can be selected from a predetermined set of possible modes of operation of a hybridized drivetrain and by which the risk of erroneous decisions can be minimized and by which, at the same time, computational time can be saved. Furthermore, a method is intended to be provided, which can easily and intuitively be extended to additional target criteria.

In accordance with general aspects of the invention, a method for selecting a mode of operation of a hybrid vehicle is proposed, in which an ideal mode of operation with respect to predetermined optimization criteria is selected together with an ideal power distribution in the drivetrain from the set of possible modes of operation of the vehicle or the drivetrain within the scope of a multistage process. Below, the optimization criteria are also referred to as target criteria. Here, the decision of determining an ideal power distribution in the drivetrain is decoupled from the decision or selection of an ideal mode of operation, i.e. the ideal power distribution is initially determined for each possible mode of operation and the mode of operation ideal in respect of the target criteria is subsequently selected on the basis of this calculation result.

Hence, in accordance with one aspect of the invention, a method for selecting the mode of operation of a hybrid vehicle is provided, in which a mode of operation, ideal for the current or real time operation with respect to predetermined target criteria, with a corresponding ideal power distribution in the drive train is selected from a predetermined set of possible modes of operation of a hybridized drivetrain. At least one evaluation variable for the quantitative description of the respective target criterion is set or determined in advance for each one of the predetermined target criteria. The phrase "in advance" is understood to mean fixing the evaluation variables "offline", i.e. not during the travel operation of the vehicle but already prior to or during the setup by programming of the vehicle control embodied for carrying out the online method.

For the purposes of the online calculation of the ideal mode of operation selection the method furthermore comprises the following:

The possible power distributions in the drivetrain and the values of the evaluation variables quantitatively describing the target criteria are determined for each mode of operation of a first selection of possible modes of operation, wherein the values of the evaluation variables are calculated for each one of the determined power distributions of the respective mode of operation, at least if the values thereof are dependent on the power distribution. Therefore, a value of each one of the evaluation variables is assigned in each case to each operating point of a possible power distribution of a mode of operation. The target criterion of maximizing the energy efficiency can be described, for example, quantitatively by an evaluation variable which specifies the efficiency of the electric traction machine. The efficiency is then respectively determined in each mode of operation for each one of the determined power distributions.

Subsequently, an ideal power distribution in the drivetrain is determined for each mode of operation of the first selection of the modes of operation by the determined values of the evaluation variables.

Subsequently, there is a selection of an ideal mode of operation using those values of the evaluation variables for the modes of operation of the first selection, in each case at the operating point of the determined ideal power distribution. Preferably, the corresponding previously determined ideal power distribution for this mode of operation is set as power distribution for the selected ideal mode of operation to be set.

Thus, in other words, the current ideal power distribution in the drivetrain is determined for each mode of operation in a manner independent of the others. An advantage thereof is that this avoids cross-influences from other modes of operation when determining the power distribution ideal for one mode of operation. Only in a subsequent step are the individual modes of operation then compared to one another using the evaluation variables, wherein only those values of the evaluation variables at the operating points of the previously determined ideal power distributions are used to this end.

In this document, the phrase "a mode of operation of a hybridized drivetrain" is understood to mean a combination of a specific drivetrain configuration and the form of the energy flows in the involved components. The possible modes of operation of the drivetrain can comprise at least two of the following modes of operation known per se: a pure combustion-engine-related travel; a pure electric travel with the combustion engine switched off; an electric travel with the combustion engine operating at idle speed; a boost operation, in which the summed drive power lies over the power that can currently be provided by the combustion engine alone and wherein the additional power is provided by the electric traction machine, fed by the electric traction energy store; a gliding operation, i.e. a rolling operation, in which the combustion engine and/or the electric machine operating as a generator are not dragged by the kinetic energy of the vehicle; a brake recuperation; an electric start; a load-point increase; a load-point reduction; and a so-called genset operation, in which the power supplied by the combustion engine is converted into electric power by the electric machine for the purposes of supplying the auxiliary units and/or for charging the electric energy store without torque being applied to the drive wheels.

A power distribution specifies the subdivision of the overall power of the drivetrain among the individual components of the drive unit in the hybridized drivetrain in view of current power demanded by the driver (e.g. in the form of a positive or negative torque requested by the driver). In accordance with the highlighted embodiment of the invention, the hybrid vehicle is a parallel hybrid vehicle with a combustion engine and an electric traction machine operable independently of one another but are seated on a common shaft such that they are always moved with the same rotational speed in the coupled case and such that the torques thereof add. In this case, the distribution of the torque requested by the driver among the rotational moment (torque) of the combustion engine and the rotational moment (torque) of the electric machine corresponds to the power distribution in the drivetrain. In the case of a given torque requested by the driver it is therefore possible to specify the possible power distributions in the drivetrain for each mode of operation by the torques generable by the electric traction machine in this mode of operation, which torques are restricted by the capability of the electric machine. Accordingly, the ideal power distribution for each mode of operation for a parallel hybrid vehicle can be specified by a torque of the electric traction machine which is ideal in respect of the predetermined target criteria. However emphasis is placed on the fact that the method is not restricted to parallel hybrid vehicles.

The ideal selection of a mode of operation is understood to mean the selection of that mode of operation which offers the best possible compromise in view of the plurality of predetermined target criteria.

In addition to the aforementioned maximization of the energy efficiency as a target criterion for the selection of the ideal mode of operation, it is possible to predetermine further target criteria such as the conditioning of the energy store, a fuel consumption minimization, and/or the highest possible travel comfort. It was already mentioned above that at least one evaluation variable is set for each one of the target criteria, which evaluation variable can describe the respective target criterion quantitatively. By way of example, the travel comfort target criterion can be described quantitatively by an evaluation variable which specifies a change in the current torque, in particular the occurrence of a jump in the torque. The travel comfort for the driver decreases with increasing jumps in the torque. For the purposes of quantitatively describing the fuel consumption minimization, use can be made, for example, of an evaluation variable which specifies the fuel mass flux passing through the cylinders of an combustion engine.

In accordance with one preferred embodiment of the invention, the following steps are carried out for the purposes of determining the ideal power distributions determined in each case for each mode of operation of the first selection of possible modes of operation, wherein the steps are carried out in each case for each mode of operation of the first selection:

An ideal value of each evaluation variable is determined in the respective mode of operation, which ideal value is established on the basis of the previously determined values of the respective evaluation variable in the respective mode of operation. Below, this ideal value is referred to as "first ideal value" in order to distinguish this ideal value from a subsequent "second ideal value" which is determined within the scope of the subsequent selection of the ideal mode of operation.

In accordance with a further step of this preferred embodiment, a weighted first deviation of the values of the respective evaluation variables from the determined first ideal value of the respective evaluation variable is then determined for each evaluation variable for the purposes of determining the ideal power distribution of each mode of operation. As mentioned above, these weighted first deviations for the evaluation variables are also determined in each mode of operation. Therefore, this weighted first deviation of each one of the evaluation variables is calculated for each operating point of a possible power distribution of a mode of operation. For the purposes of calculating the weighted first deviations, corresponding evaluation or weighting factors are preferably predetermined, said factors evaluating the deviations of the individual evaluation variables from their first ideal value and scaling these onto a common comparison basis.

In accordance with a further step of this preferred embodiment, there subsequently is a determination of the ideal power distribution of the respective mode of operation using a predetermined first decision rule that sets an ideal power distribution in a manner dependent on the determined weighted first deviations of the evaluation variables.

If the target criterion of an evaluation variable, the first ideal value of which is determined, is an extremization target, the first ideal value is set as an extremal value of the determined values of the respective evaluation variable in the respective mode of operation.

If the extremization target is a maximization target, for example the maximization of the energy efficiency of the electric traction machine or the maximization of the travel comfort, the maximum value of the values of the evaluation variables emerging for the possible power distributions of a mode of operation is set as the respective first ideal value.

However, if the target criterion of an evaluation variable is an approximation target, for example if the target criterion should ensure that the traction energy store observes predetermined charge state boundaries, the first ideal value can be predetermined as a setpoint value which is independent of the determined values of the evaluation variable in the respective mode of operation, e.g. in the form of a setpoint value for the current setpoint power of the electric traction energy store, which is calculated depending on current vehicle information, e.g. the current charge state.

An advantage of this embodiment lies in the fact that the various target criterion need not be summed in the form of individual partial cost functions to an overall cost function. Instead, each target criterion is initially evaluated on its own and independently of the other target criteria in view of the different modes of operation and power distributions possible therein and it is then transferred to a common evaluation scheme by means of the weighted deviations. This approach offers the advantage that the method can easily be complemented by further desired target criteria where necessary. All that is required in this case is to set a suitable further evaluation variable which quantitatively describes a target criterion for the new target criterion and additionally carry out the aforementioned steps analogously for the further evaluation variable. An adaptation of a complex mathematical formula, as would be necessary in the case of an overall cost function, is not required.

In accordance with a further preferred embodiment, the following steps are carried out for the purposes of selecting an ideal mode of operation from the first selection of possible modes of operation:

A second ideal value of the evaluation variables, valid for all modes of operation of the first selection, is determined for each evaluation variable on the basis of the determined values thereof. In contrast to the first ideal value, which is determined as a "local" ideal value for each evaluation variable in each mode of operation, the second ideal value is determined as a "global" ideal value valid for all modes of operation, and so respectively one second ideal value is set for each evaluation variable independently of the mode of operation.

In accordance with this further preferred embodiment, a weighted second deviation is furthermore determined for the purposes of selecting the ideal mode of operation, which weighted second deviation is determined in each case for each evaluation variable in each mode of operation of the first selection and in each case specifies a weighted deviation of the second ideal value of the respective evaluation variable from the value of the evaluation variable at the operating point of the determined ideal power distribution for the respective mode of operation. In other words, a weighted difference in terms of magnitude is determined for each mode of operation of the first selection, which difference specifies a deviation of the value of the evaluation variable in the ideal power distribution from the mode of operation-independent second ideal value of the evaluation variable.

Subsequently, the ideal mode of operation is selected using a predetermined second decision rule that evaluates the modes of operation of the first selection, in each case in a manner dependent on the weighted second deviations of the evaluation variables, and sets an ideal mode of operation.

If the target described by the evaluation variable is an extremization target, the second ideal value is preferably set as an extremal value of the values of the respective evaluation variable at the operating point of the previously determined ideal power distribution in all modes of operation of the first selection. Therefore, in the case of a maximization target, the second ideal value of a specific evaluation variable corresponds to the maximum value of the values of these evaluation variables in the various modes of operation at the operating point of the ideal power distribution. If the target criterion is a minimization target, the minimum of these values is correspondingly set as the second ideal value. However, if the target criterion described by the evaluation variable is an approximation target, the second ideal value is predetermined as a setpoint value independent of the determined values of the respective evaluation variable, which setpoint value can be calculated in turn in a manner dependent on current vehicle information.

It was already mentioned above that it is possible to respectively provide at least one weighting factor or evaluation factor for each evaluation variable for the purposes of determining the weighted first deviation or determining the weighted second deviation, which weighting factor or evaluation factor scales the difference in terms of magnitude of the values of the evaluation variables from the first and second ideal value, respectively, of the respective evaluation variable to a dimensionless basis or to a cost basis common to all evaluation variables, i.e. a basis with a common unit.

Using the weighting factors it is possible to transfer evaluation variables, which quantitatively describe very different target criteria, such as the maximization of the energy efficiency of the electric traction machine, fuel consumption minimization, emission minimization, etc., to a common and therefore comparable basis and at the same time evaluate said variables. Within this meaning, an evaluation means that a deviation of e.g. x % of a first variable, which e.g. evaluates energy efficiency, from the ideal value thereof can be evaluated to be more critical than a 10% deviation of a second evaluation variable, describing an emission target, from the ideal value thereof. This different weighting or evaluation of the evaluation variables can thus be undertaken in a simple manner on the basis of setting the weighting factors.

Furthermore, it was already mentioned above that the ideal power distribution of each mode of operation is determined using a first decision rule, to which the determined weighted first deviations of the evaluation variables are fed as input data and from which an ideal element is selected in accordance with the decision rules. In a comparable manner, a second decision rule is used to select the ideal mode of operation, to which second decision rule the weighted second deviations of the evaluation variables are fed as input data.

A selection of an ideal element from a plurality of variants evaluated by evaluation variables using decision rules is known from the field of game theory or the field of multi-critical decision problems. The different types of decision rules, such as the minimax principle or the so-called lexicographical order known in these fields, can be used as decision rules. It should be noted that the known decision rules each have different strengths and weaknesses, and so the use of a specific decision rule is always accompanied by specific advantages and disadvantages.

What was determined within the scope of the invention is that it is particularly advantageous for the present method according to the invention for selecting an ideal mode of operation if the second decision rule is embodied such that the weighted second deviations of the evaluation variables of in each case one mode of operation are summed and the mode of operation whose summed value of the summed second deviations is minimal is set as an ideal mode of operation. Therefore, in accordance with this variant, the summed values are used to select the mode of operation which has the lowest overall damage sum in the form of the summed second deviations as ideal mode of operation.

By contrast, it is particularly advantageous if the first decision rule, which is used to evaluate the first deviations, the deviations from the local first ideal values, is a minimax decision rule. Here, in accordance with the first decision rule, the largest first deviation can be established at each operating point of the possible power distributions of a mode of operation, in each case from the values of the weighted first deviations of the evaluation variables, and the operating point that has the smallest one of the largest first deviations established thus can be set as operating point of the ideal power distribution. In accordance with this variant, the "worst case" is minimized for the purposes of determining the ideal power distribution in accordance with the minimax principle, which, according to the discoveries of the inventors, enables a better compromise of the target criteria than a simple addition when determining the ideal power distribution.

A further particularly advantageous embodiment of the invention provides for the first selection of the modes of operation, on the basis of which the aforementioned determination of the ideal power distribution for each mode of operation and the subsequent determination of the ideal mode of operation is carried out, already to be cleaned from modes of operation of the hybrid vehicle which, are possible in principle but not possible in the current movement state of the vehicle and/or which are excluded due to other restriction rules. This restriction of the modes of operation enables a significant reduction in the computational outlay for the subsequent determination of the ideal power distribution and the ideal mode of operation.

In accordance with this variant, determining the first selection of the modes of operation therefore comprises the following steps: predetermining possible vehicle movement states of the hybrid vehicle, predetermining possible modes of operation of the drivetrain and predetermining an assignment specifying which ones of the possible modes of operation are admissible in which vehicle movement state; determining a current vehicle movement state; and restricting the modes of operation of the vehicle to those that are assigned to the determined current vehicle movement state.

By way of example, the predetermined possible vehicle movement states can comprise a vehicle standstill, a braking operation and a travel operation (without braking), also referred to as "travel" below. By way of example, the combustion-engine-related travel, electric travel, load-point increase and load-point decrease modes of operation can be assigned to a "travel" vehicle movement state. Conventional braking, brake recuperation and gliding modes of operation can be assigned to the "braking" vehicle movement state. The idle and genset modes of operation can be assigned to the "standstill" vehicle movement state.

This number of modes of operation reduced dependent on the vehicle movement state can be advantageously reduced further by virtue of at least one restriction rule being predetermined, said restriction rule setting which modes of operation are currently available depending on at least one operating parameter and preferably independently of a current torque requirement and the current vehicle movement state. In accordance with this at least one restriction rule, it is then possible to undertake a further restriction of the modes of operation of the vehicle to those that are currently available. By way of example, an availability of components in the drivetrain can be checked in accordance with the at least one restriction rule, in particular the availability of an electric energy store and/or electric traction machine. By way of example, the restriction rule can predetermine that all modes of operation requiring the use of the electric machine are currently inadmissible if the electric energy store exceeds predetermined temperature limits and/or if it is situated outside of predetermined charge state boundaries. In this manner, it is already possible to exclude those modes of operation which are unavailable in the current operating state of the vehicle prior to starting the calculation of the ideal power distribution for each mode of operation.

In accordance with a further aspect of the invention, it is possible, when determining the ideal power distribution for each mode of operation, to determine certain values of the power distributions of the modes of operation, which should be excluded as possible operating points on the basis of predetermined exclusion criteria. The exclusion criteria are preferably defined such that each possible power distribution that is not excluded in general already constitutes an acceptable selection candidate. Hence, the ideal mode of operation and/or an ideal power distribution are sought after only on the basis of comparatively "good" power distributions and the risk of an incorrect decision is reduced.

The invention furthermore relates to hybrid vehicle, in particular a commercial vehicle, comprising a control apparatus for selecting a mode of operation of the hybrid vehicle configured to carry out the method as disclosed herein. In order to avoid repetition, features disclosed only in terms of the method should also count as being disclosed and be claimable as device features of the control apparatus.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The preferred embodiments and features of the invention described above are combinable with one another as desired. Further details and advantages of the invention are described below with reference to the attached drawings. In detail.

DETAILED DESCRIPTION OF THE PRESENTLY PREFERRED EMBODIMENTS

Figure 1:
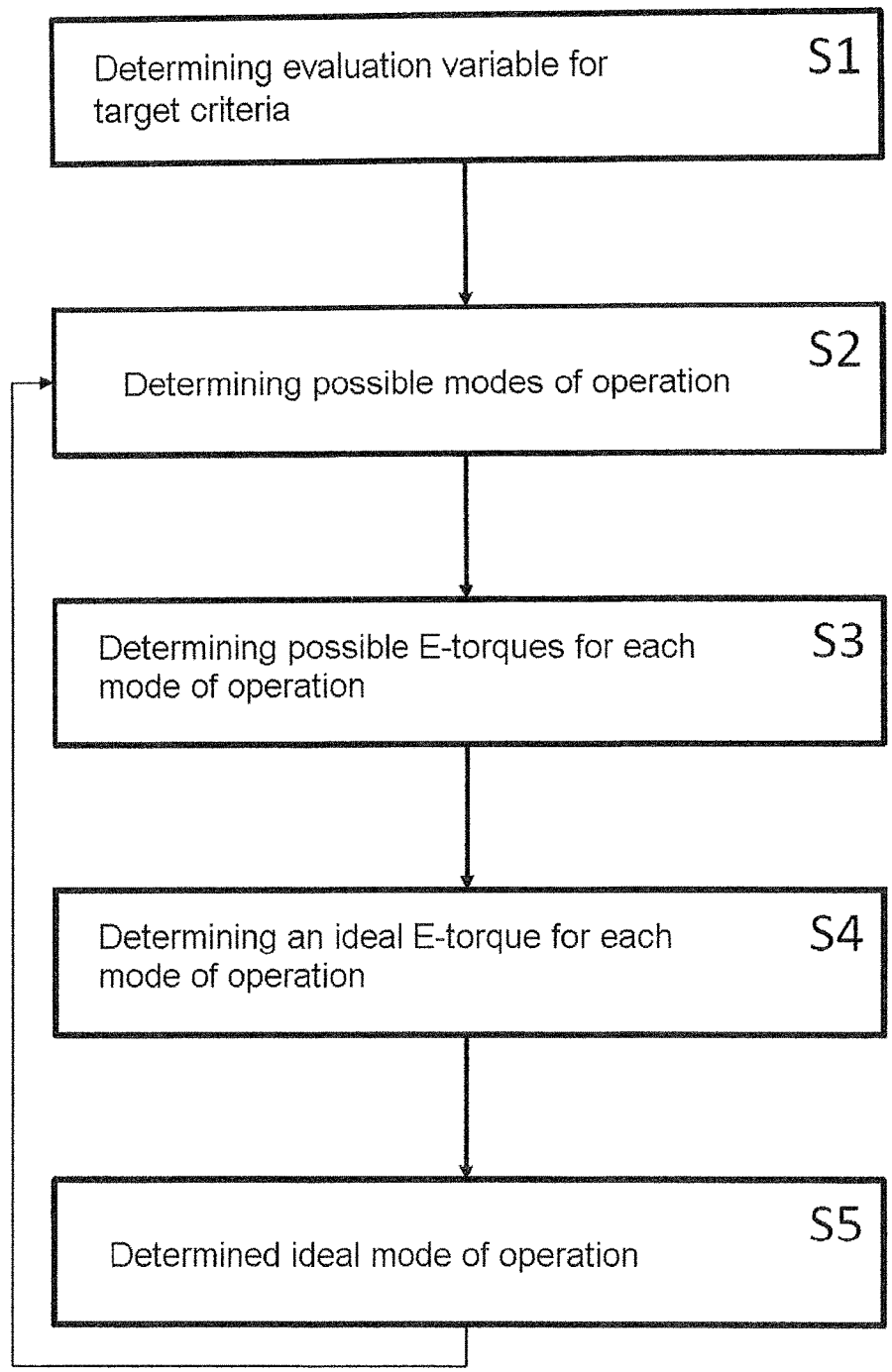
FIG. 1 is a schematic flowchart of a method for selecting a mode of operation of a hybrid vehicle.

FIG. 1 shows an exemplary flowchart for illustrating the steps of a method for selecting a mode of operation of a hybrid vehicle in accordance with a preferred embodiment. In accordance with the present embodiment, the hybrid vehicle is embodied as a parallel hybrid vehicle, in particular as a commercial vehicle. The hybridized drivetrain comprises a combustion engine and an electric traction machine, wherein the combustion engine and the electric traction machine, also referred to as electric machine or E-machine below, are coupled in terms of rotational speed by way of a common shaft but are actuatable independently of one another.

Different modes of operation can be carried out using the hybridized drivetrain, for example a pure combustion-engine-related travel, a pure electric travel, a boost operation, gliding operation, a brake recuperation, an electric start, a load-point increase, a load-point reduction, a so-called genset operation, etc.

The various modes of operation should be used expediently during vehicle operation in order to achieve the largest possible reduction in the fuel consumption, wherein further predetermined targets, such as a maximization of the energy efficiency of the electric traction machine, the emission minimization and/or the travel comfort, should also be taken into account. Thus, for the purposes of realizing an ideal operational strategy of the hybrid vehicle, it is necessary to select a mode of operation, ideal for the current instant of operation with respect of the predetermined target criteria, with a corresponding ideal power distribution in the drivetrain from a predetermined set of possible modes of operation of the hybridized drivetrain, i.e. to select that mode of operation which offers the currently best possible compromise in respect of the target criteria at each instant of operation.

In step S1, at least one suitable evaluation variable, by which the respective target criterion can be described quantitatively, is initially set for each one of the target criteria in an offline manner, i.e. prior to carrying out the actual online optimization method. Below, this is explained in even more detail in an exemplary manner on the basis of FIGS. 6 and 7.

Then, steps S2 to S5 are carried out continuously during the operation of the vehicle and within the scope of the actual online optimization method, i.e. steps S2 to S5 are carried out again, respectively at an interval of a few milliseconds, to select and set the mode of operation ideal for the current vehicle state continuously in each case in a manner dependent on current vehicle values.

In accordance with steps S2 to S5, a mode of operation, ideal in respect of the optimization criteria, with an ideal power distribution is selected within the scope of a multi-stage process from the set of all modes of operation possible using the system.

Figure 2:
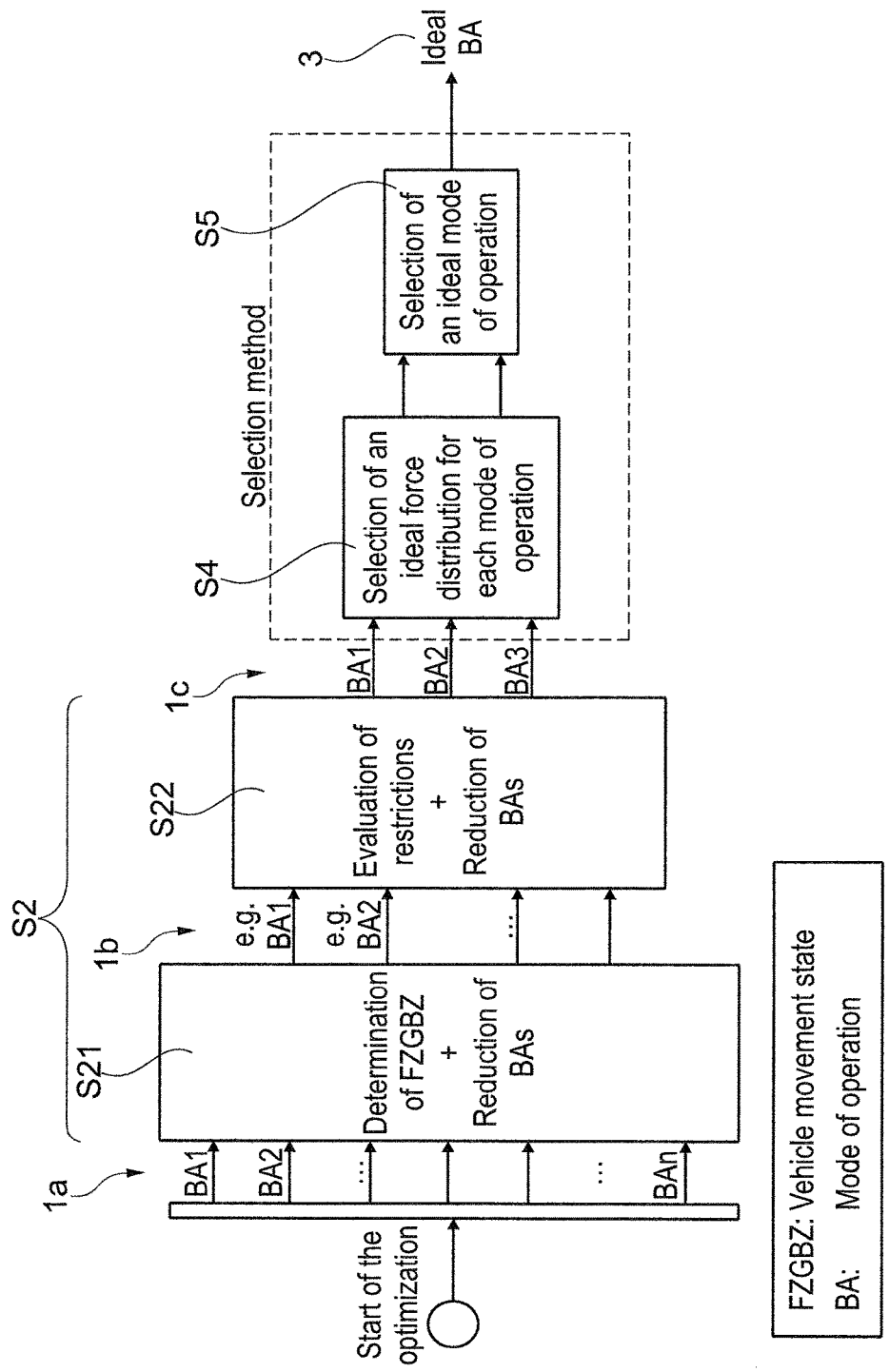
FIG. 2 is an alternative flowchart for illustrating the method.
Figure 8:
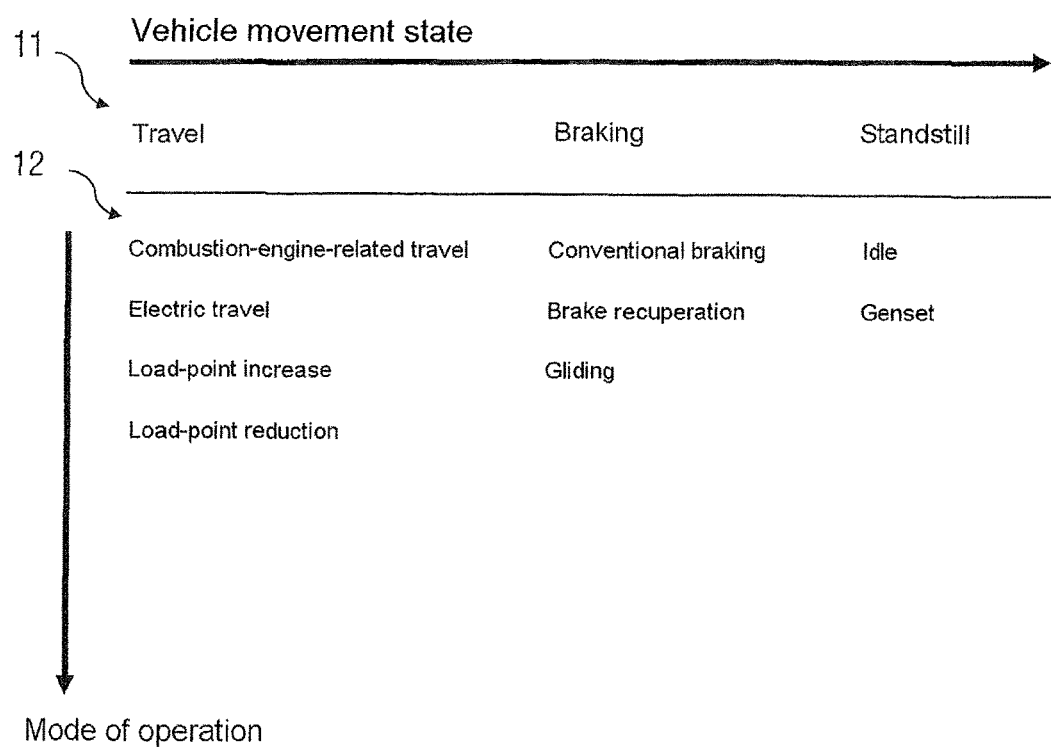
FIG. 8 is an assignment specifying which ones of the possible modes of operation are admissible in what vehicle movement state.

To this end, there initially is a reduction in step S2 of the modes of operation to a currently valid set, which is explained in more detail with respect to FIGS. 2 and 8.

At a start time of the optimization or of the respective calculation cycle, all modes of operation BA1 to BAn implementable by way of the hybridized drivetrain are initially presented to the multi-stage selection method for evaluation purposes.

FIG. 8 lists the possible vehicle movement states 11 of the hybrid vehicle: by way of example, the predetermined possible vehicle movement states are vehicle standstill, braking operation and travel operation (without braking). It is well known that it is not possible to realize each one of the modes of operation in each one of the possible vehicle movement states 11 of the vehicle. The assignment 12 specifying which ones of the possible modes of operation 12 are respectively possible in a specific vehicle movement state 11 was set in advance and e.g. stored in the form of a table in the vehicle, which table is accessed in step S2.

By way of example, it is identifiable from the assignment 12 that the combustion-engine-related travel, electric travel, load-point increase and load-point reduction modes of operation are assigned to a "travel" vehicle movement state.

Conventional braking, brake recuperation and gliding modes of operation are assigned to the "braking" vehicle movement state. The idle and genset modes of operation are assigned to the "standstill" vehicle movement state.

The modes of operation for each vehicle movement state shown in FIG. 8 are only exemplary and can be complemented by further possible modes of operation, depending on the embodiment of the hybrid vehicle.

In step S21 of FIG. 2, the current vehicle movement state is initially determined and the restriction of the modes of operation of the vehicle to those which are assigned to the determined current vehicle movement state in accordance with the assignment 12 shown in FIG. 8 is subsequently undertaken. Thus, if the vehicle is currently in the "travel" vehicle movement state, only those modes of operation assigned as possible modes of operation by way of the "travel" vehicle movement state are still fed to the subsequent step S22. The reduced numbers of modes of operation 1b are thereupon processed further in step S22.

In step S22, restrictions for individual modes of operation are evaluated on the basis of defined rules. Restrictions originate from e.g. the availability of components. By way of example, such restrictions can contain thermal restrictions which check whether the E-machine or the traction energy storage of the electric machine has become too hot such that those modes of operation requiring the E-machine are not available at the current instant and consequently excluded from the list of possible modes of operation in this case. Such restriction rules can also check whether or not the machine is available for other reasons. However, these restrictions are not related to moments, instead such criteria are only included in the subsequent steps (e.g. S45, S55), e.g. within the scope of the exclusion criteria. Optionally, the number of possible modes of operation 1b can thus be restricted further in step S22 due to predetermined restriction rules such that ultimately a first selection of possible modes of operation 1c is fed to the subsequent two-stage selection method of steps S3 to S5. It should only be assumed in an exemplary manner that the possible modes of operation of the first selection 1c was reduced to three modes of operation only in the current travel state and at the instant of the calculation of the method, which modes are subsequently denoted as BA1, BA2 and BA3.

In step S3, which has not been plotted in FIG. 2, possible power distributions in the drivetrain are established initially for each one of the modes of operation 1c remaining after the reduction of the modes of operation. In the present exemplary embodiment of a parallel hybrid vehicle, the possible power distribution is given by specifying the torques realizable by the electric machine in the current operational state. The capability of the E-machine is taken into account when calculating the possible torques of the E-machine. Then, the remaining torque to be applied by the combustion engine emerges from each possible torque of the E-machine as a difference between the currently demanded torque requested by the driver and the torque of the E-machine, and so the power distribution is uniquely set. Therefore, a range of possible values for the E-machine torques emerges for each mode of operation as a result of step S3. The possible values for the E-machine torques are calculated in discrete steps, e.g. in steps of 10 Nm.

Figure 3:
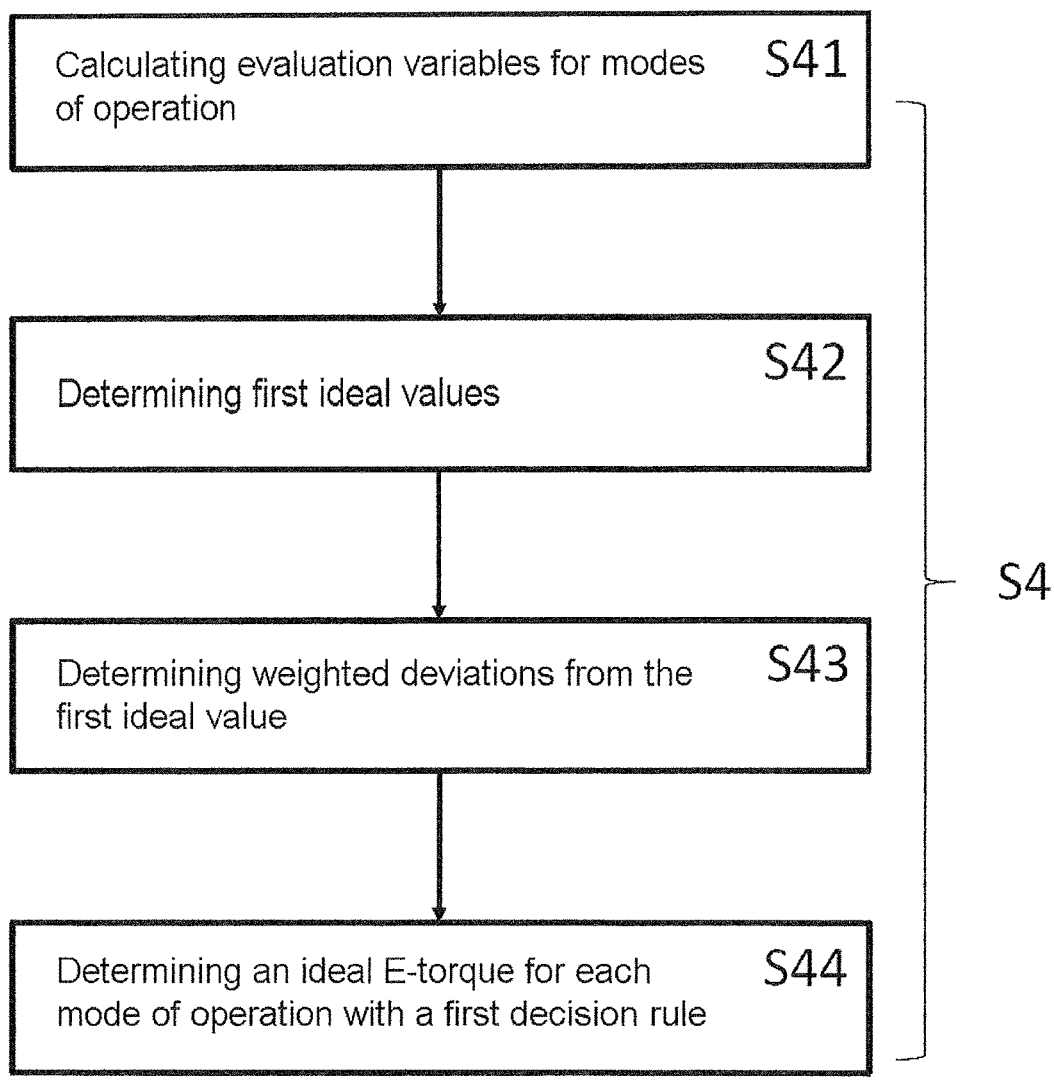
FIG. 3 is a flowchart of the steps for determining an ideal E-torque for each mode of operation.
Figure 5:
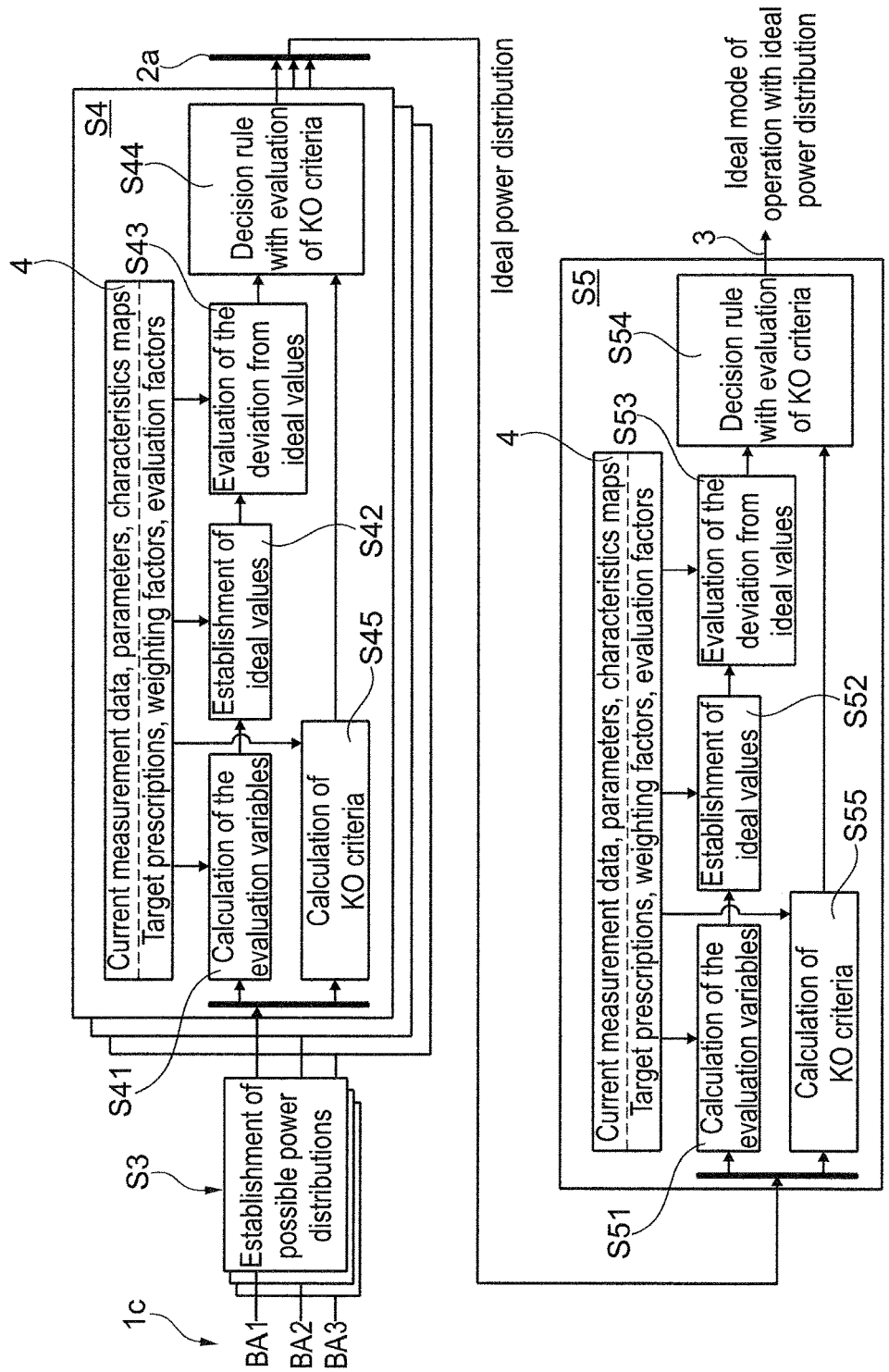
FIG. 5 is an alternative representation for illustrating the determination of the ideal power distributions and the ideal mode of operation.

Then, the ideal E-machine torque for each mode of operation is calculated in step S4. The sub-steps of step S4 are illustrated in FIGS. 3, 5 and 6, respectively in different representations.

Figure 6:
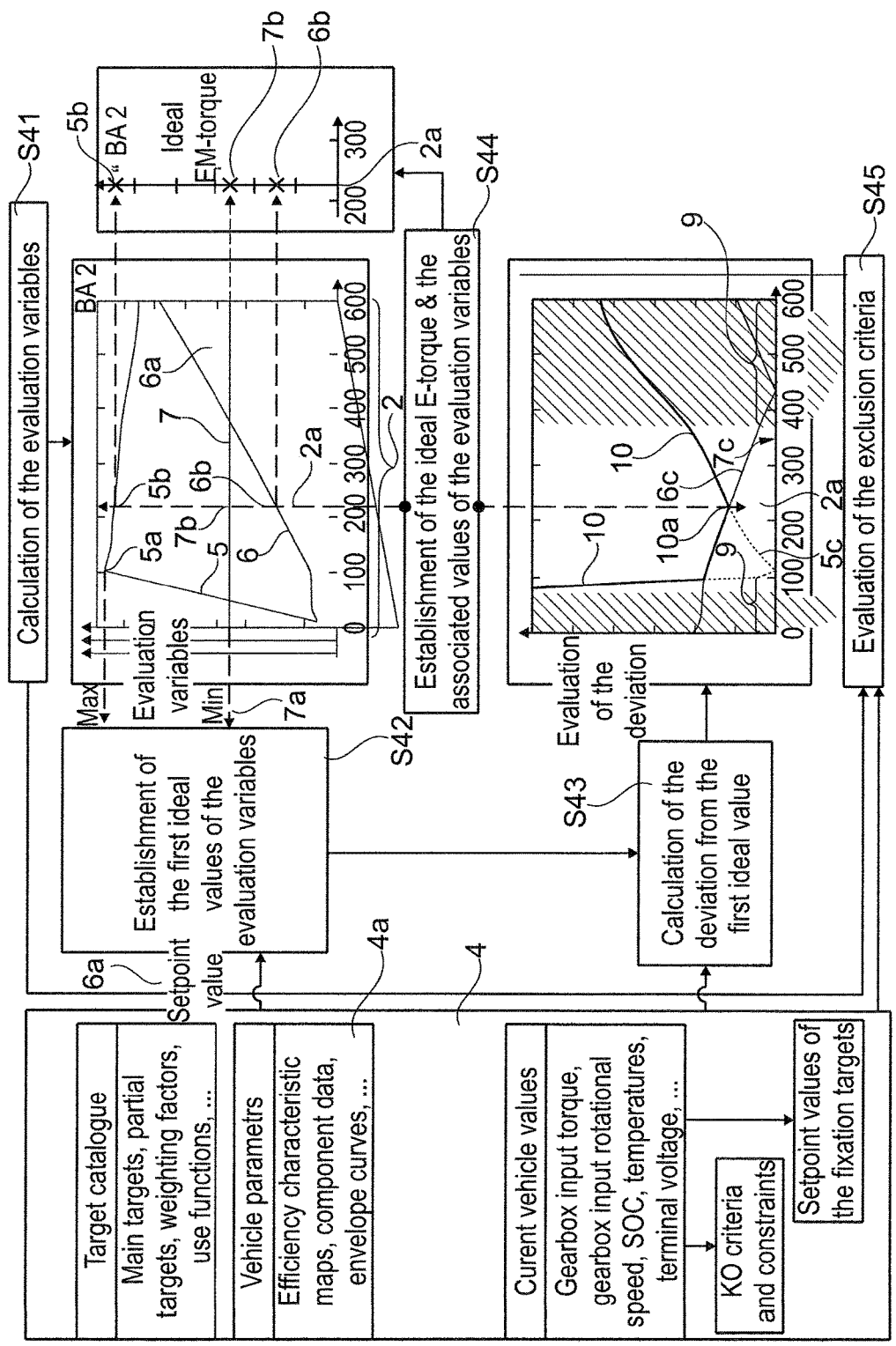
FIG. 6 is an exemplary illustration of the calculation of an ideal power distribution for a mode of operation.

In the upper diagram of FIG. 6, the values of the abscissa specify, in an exemplary manner, the possible E-torques of one of the modes of operation of the first selection 1c determined in step S3, in this case in an exemplary manner for the mode of operation BA2. In the present case, the mode of operation BA2 represents the load-point reduction mode of operation, in which the power required for satisfying the positive torque requested by the driver is provided both by the combustion engine and by the E-machine. The load-point reduction is used for the operating point optimization of the combustion engine or for the targeted discharge of the energy store. For this mode of operation, possible E-torques 2 in the range of 0-600 Nm were determined in the current operational state in discrete steps of 10 Nm (cf. Step S3).

Then, the values of the evaluation variables for each mode of operation are calculated in steps S41 and S42 and the first ideal value for each evaluation variable is subsequently determined in the respective mode of operation.

The curves 5 and 6 as well as the horizontal line 7, plotted in the diagram, specify the characteristic line of the values of three evaluation variables, calculated in step S41, in a manner dependent on the determined possible torques 2 of the E-machine or the power distribution.

In accordance with the present example, curve 5 specifies the characteristic line of an "efficiency of the electric traction machine" evaluation variable. The unit of this evaluation variable is dimensionless. This evaluation variable is used for the quantitative description of the target criterion of maximizing the energy efficiency of the electric traction machine.

The target criterion of maximizing the energy efficiency of the electric traction machine is a maximization target, i.e. the energy efficiency should be maximized. Consequently, the maximum value of the curve 5 is determined in step S42 as the first ideal value 5a of the "efficiency of the electric traction machine" evaluation variable.

In the present case, the characteristic line 5 of this evaluation variable as a function of the torque 2a of the E-machine has a maximum 5a at an E-machine torque value of e.g. 100 Nm. This means that the maximum efficiency is achieved at an E-machine torque of 100 Nm, i.e. if the E-machine provides 100 Nm in reaction to a positive current torque requested by the driver and if the remaining difference from the torque requested by the driver is provided by the combustion engine. From the characteristic line 5, it is identifiable that the efficiency at an E-torque greater than 100 Nm drops off again. By way of example, this is due to the fact that the loss power increases quadratically toward higher rotational moments. The characteristic line 5 is calculated by a stored efficiency characteristic map 4a of the electric traction machine.

The line denoted by reference sign 6 in the upper diagram in FIG. 6 represents a characteristic line of the battery power and shows the charge and discharge power of the energy store, in which the efficiency of the traction energy store is incorporated. The discharge power increases with a higher E-torque to be applied by the E-machine, depicted by the increase of the curve 6. No maximum or minimum of the characteristic line 6 is sought after in this curve; instead, the assigned target criterion is an approximation target relating to the ideal charge state of the energy store, which should lie in a predetermined range. If the traction energy storage is fully charged, it is advantageous to discharge the latter in order subsequently once again to have sufficient storage capacity for receiving recuperation energy. If the traction energy store was strongly discharged, it is advantageous to recharge the latter. Consequently, the first ideal value for the characteristic line of the curve 6 is predetermined as a setpoint value 6a depending on current vehicle data, in particular depending on the current charge state of the traction energy store, which, in the present state, is achieved by a value of the E-torque at 440 Nm.

The characteristic line of the curve 7 is the characteristic line of a further evaluation variable for evaluating a further target. This evaluation variable represents, in an exemplary manner, an evaluation variable not dependent on the current E-torque. The characteristic line of such an evaluation variable is exhibited as a horizontal straight line in relation to the E-torque and only becomes important in the subsequent step of comparing the various modes of operation amongst themselves. A minimum is identified as an ideal value for this evaluation variable. On account of the constant characteristic line of the curve 7, this minimum 7a is not assigned to specific rotational moment.

The first ideal values 5a, 6a and 7a are determined not only for the mode of operation BA2 but for all modes of operation of the first selection.

The depicted characteristic line 5, 6, 7 of the values of the evaluation variables is recalculated during each cycle through steps S2 to S5. Here, the individual calculation steps have available to them information such as current measurement data, vehicle and component parameters and characteristic maps, which are processed by a vehicle controller 4 configured to carry out the method and in which the target variables, exclusion criteria (KO criteria), weighting factors, vehicle parameters to be used, etc. are stored, which is indicated merely in an exemplary and very schematic manner by block 4.

The calculation of the characteristic lines 5, 6, 7 of the evaluation variables is carried out in a manner dependent on current measurement data, vehicle and component parameters and characteristic maps and is dependent on, in particular, the specific drivetrain configuration of the hybrid vehicle.

The characteristic lines 5, 6, 7 of the evaluation variables determined thus in each case only apply to a calculation cycle of steps S2 to S5 of the online calculation; i.e., different characteristic lines and different ideal values 5a, 6a, 7a may emerge in a subsequent calculation cycle S2 to S5, which is carried out a few milliseconds later or in a different travel situation, since the vehicle parameters and measurement data change continuously.

In step S43, the weighted first deviation of the values of the respective evaluation variable from the determined first ideal value of the respective evaluation variable is established for each evaluation variable of each mode of operation. This is depicted in the lower diagram in FIG. 6. In order to determine the weighted deviation, the difference values from the original curve 5, 6, 7 with the respective ideal value 5a, 6a and 7a, respectively, are formed for each curve in each case and additionally scaled by a weighting factor (evaluation factor).

Since the ideal value 5a is assigned to an E-torque of just over 100 Nm, the characteristic line of the weighted first deviation 5c has a zero at this rotational moment value of the electric machine. A corresponding statement applies to the weighted first characteristic line 6c of the battery power, which has a zero at the setpoint value of approximately 440 Nm. The weighted characteristic line 7c can only be identified with difficulties in the diagram since it lies directly on the abscissa axis, a fact emerging from the constant characteristic line 7 in the upper diagram. Therefore, this evaluation variable as it were drops out of the current evaluation in the present case because there is no ideal value.

By way of the scaling with the weighting factor, the determined first deviations can be transferred, firstly, to a dimensionless unit or to a common unit, e.g. a monetary unit of a damage function, since the evaluation variables are generally specified in different units. Secondly, the weighting enables a calibration of the first deviations of the evaluation variables amongst themselves in order to prioritize the evaluation variables amongst themselves since, in general, the target criteria assigned to the evaluation variables should be weighted or prioritized to different extents.

FIG. 5 illustrates that optional exclusion criteria (denoted "KO criteria" in FIG. 5) that may admit only certain E-machine torques may be predetermined. Thus, for example, only those E-machine torques which have a minimum efficiency, e.g. E-torques in which the current efficiency of the electric traction machine corresponds to at least 80 percent, are admitted in step S45 on the basis of a predetermined exclusion criterion. Therefore, certain E-torques 9 of the possible power distribution for each mode of operation are excluded by way of these exclusion criteria, which is depicted by the hatched regions in the lower diagram in FIG. 6. In these regions, the values of the evaluation variable or of the weighted first deviation are therefore not taken into account in the subsequent determination of the ideal mode of operation.

An advantage when applying such exclusion criteria lies in the fact that these can be set in such a way that each E-torque not excluded thereby already constitutes an acceptable selection candidate, and so the ideal value of the power distribution is subsequently only sought after within acceptable power distributions or E-torques. As a result, the risk of a wrong decision can be reduced. Furthermore, this can compensate weaknesses of the subsequently applied decision rules since this at least ensures that the selection of the ideal mode of operation is always based upon an acceptable E-torque.

In this step S44, an ideal E-machine torque 2a is subsequently determined using a predetermined decision rule.

By way of example, it would be possible simply to add all curves 5c, 6c and 7c and select that operating point, i.e. that E-machine torque, which has the smallest value of the added first weighted deviations 5c, 6c and 7c of all evaluation variables for each mode of operation. This represents the point of the lowest overall damage.

However, a disadvantage of this comparatively simple decision rule is that the ideal value may be situated under the ideal value of a partial target. This is disadvantageous if a very ideal solution was found in respect of a target criterion but this is a comparatively bad solution in respect of all other target criteria.

Therefore, a solution that constitutes a good compromise between all target criteria is preferred. A decision rule based on the minimax principle is better suited to this end. Such a minimax decision rule, which is depicted by the characteristic line of the dash-dotted curve 10, was applied in the lower diagram in FIG. 6. The curve 10 specifies the worst case by virtue of the largest first deviation being established in each case from the values of the weighted first deviations 5c, 6c, 7c at each point of operation of the possible torques. The E-torque 2a, which is assigned to the smallest 10a of the established largest first deviations 10, is then selected as ideal power distribution. In the present case, this is the case at the point 2a, since the dash-dotted curve has its minimum 10a at the operating point 2a. Reference should once again be made to the fact that FIG. 6 only depicts the determination of the ideal E-torque for one mode of operation in each case, namely the "BA2" mode of operation. However, within the scope of step S4, the values of the evaluation variables with the associated ideal values and the weighted deviations from the first ideal values are calculated for all modes of operation of the first selection 1c and the ideal power distribution is subsequently determined for the respective mode of operation.

The right-hand upper diagram once again depicts the result of step S44 for the BA2 mode of operation. The point 2a is determined as an ideal E-machine torque from the possible values 2 of the E-machine torques in the BA2 mode of operation. Assigned to this operating point 2a of the ideal power distribution are the values 5b, 6b and 7b as associated values of the evaluation variables, which are subsequently fed to the step S5.

Figure 4:
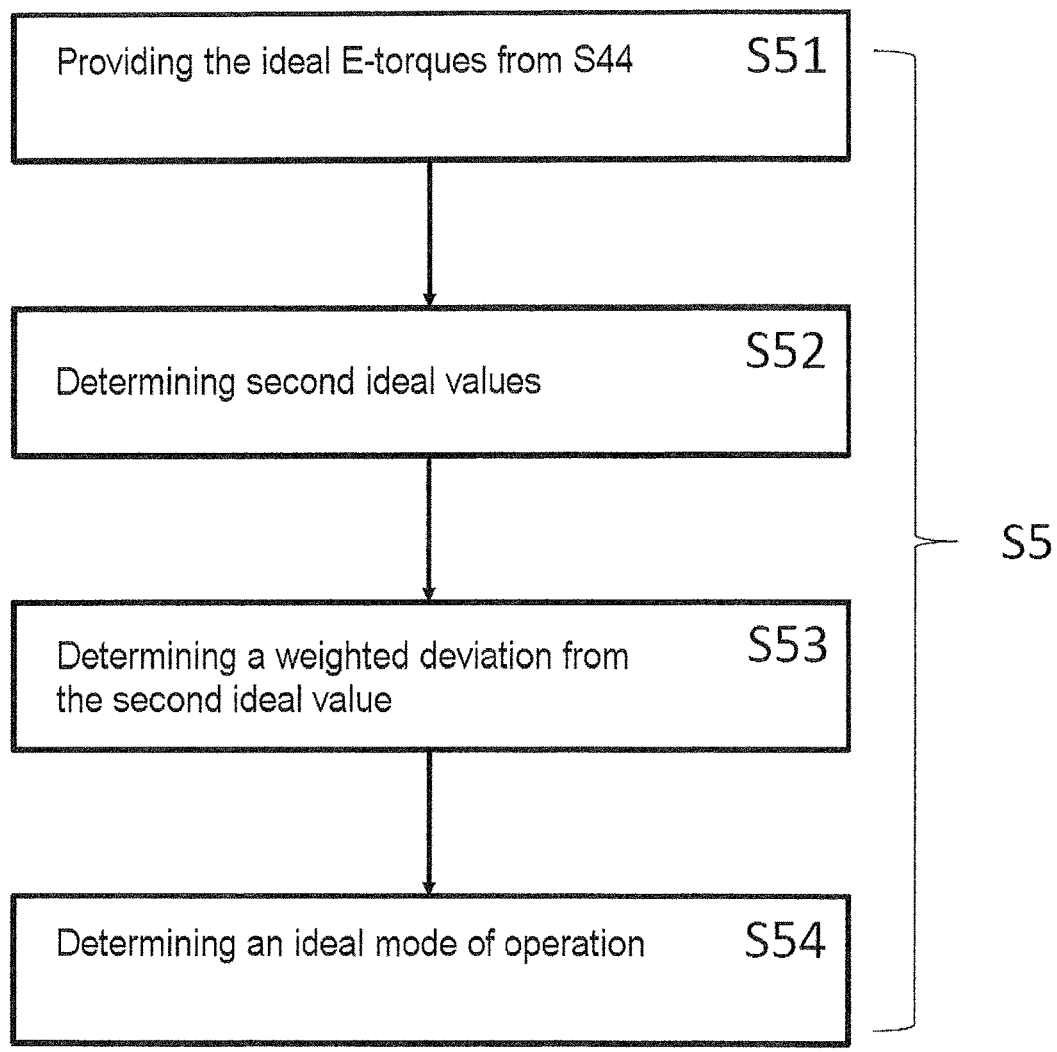
FIG. 4 is a flowchart for illustrating the determination of the ideal mode of operation on the basis of the determined ideal power distributions.

Then, the ideal mode of operation is determined in step S5 on the basis of the results from step S4. To this end, steps S51 to S54 or S55 are carried out, which once again is illustrated in different representations in FIGS. 4, 5 and 7.

Figure 7:
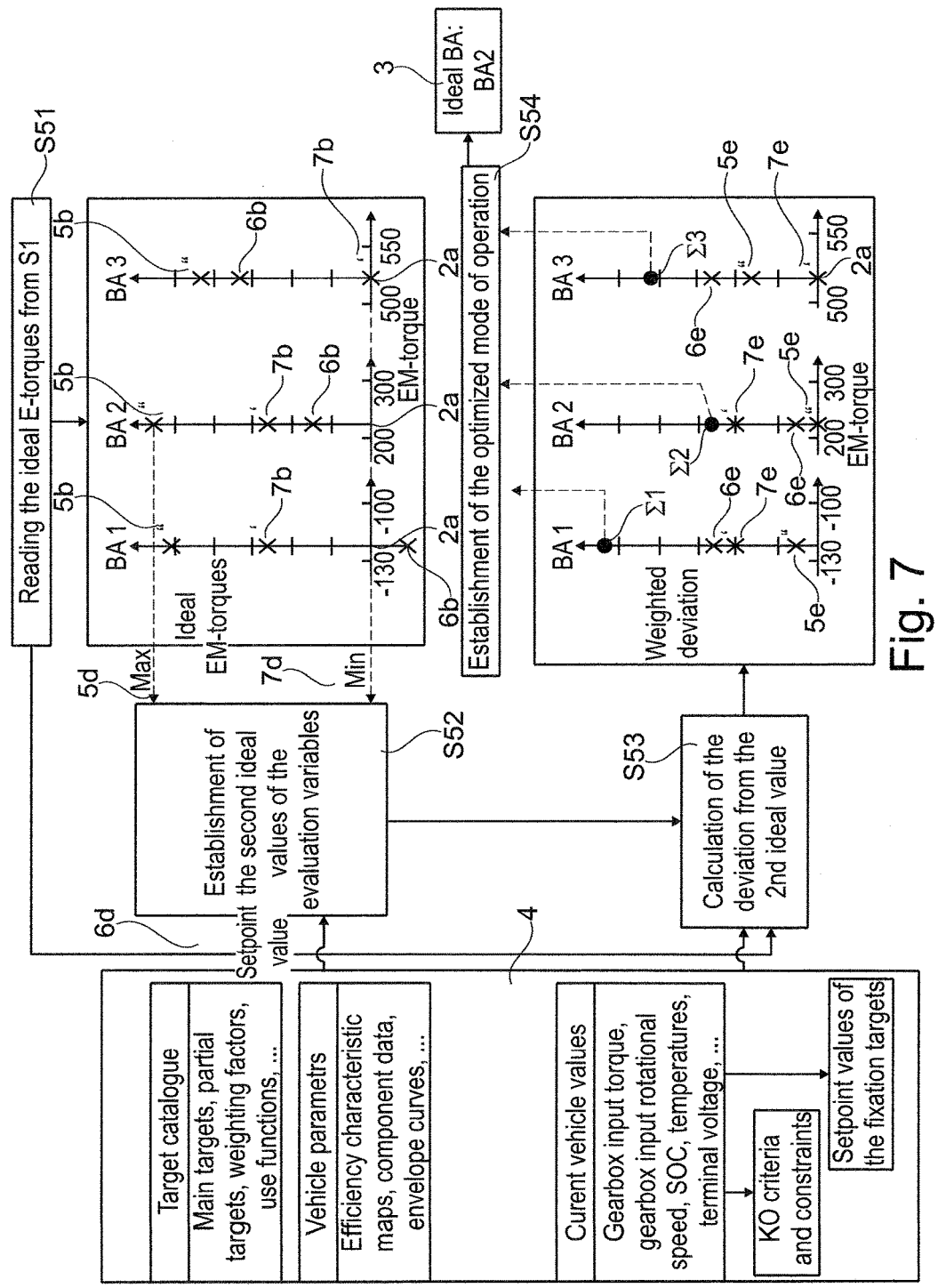
FIG. 7 is an exemplary illustration of the determination of the ideal mode of operation on the basis of the determined ideal power distributions.

Initially, the ideal E-torques for the individual modes of operation and the associated values of the evaluation variables 5b, 6b, 7b, which were determined in step S44, are provided as input data in step S51, which is depicted in an exemplary manner for the three modes of operation BA1, BA2, BA3 and the upper diagram of FIG. 7.

Depicted in the centre once again is the BA2 mode of operation, which was already explained in FIG. 6, with the ideal E-torque 2a thereof at a level of e.g. 220 Nm and, in each case, the associated values 5b, 6b, 7b of the evaluation variables at this operating point 2a of the ideal power distribution.

Depicted to the left thereof is the "BA1" mode of operation, which represents a mode of operation of the load-point increase. In the case of the load-point increase, the combustion engine provides power both for completely satisfying the positive torque requested by the driver and for simultaneously charging the traction energy storage.

The BA3 mode of operation represents a mode of operation of pure electric travel.

It is a special aspect of the present exemplary embodiment that, in a manner analogous to the steps of determining the ideal power distribution for each mode of operation, comparable steps are carried out for determining the ideal mode of operation, which is easily identifiable in FIG. 5 since the steps S52 to S55 in principle correspond to the steps S42 to S45. The peculiarity when carrying out the steps S52 to S55 lies in the fact that the calculation steps are now run through with the ideal power distributions 2a of the modes of operation and the associated values 5b, 6b, 7b of the evaluation variables.

Initially, in step S52, the ideal values 5d, 6d, 7d of the evaluation variables are once again determined. Whether the respective ideal value is a maximum value, a minimum value or setpoint value once again depends on the respective target criterion.

Once again, the maximum value is sought for the purpose of maximizing the energy efficiency of the electric traction machine. However, it is sought after over all modes of operation in this case such that the value 5b that has the largest value at the operating point 2a of the ideal E-torque is established in each case is a maximum value 5d. In the present case, this is the point 5b of the BA2 mode of operation since the value 5b of the BA3 mode of operation and of the BA1 mode of operation is smaller.

Once again, a setpoint value 6d, which is set as an ideal value, is predetermined as evaluation variable for the battery power.

The minimum value is sought after for the configuration change 7 evaluation variable. As minimum value 7d, the value 7b with a level of zero in the mode of operation 3 is set as an ideal value. The ideal value 5d, 6d, 7d for each evaluation variable determined thus, referred to below as second ideal value, applies to all modes of operation BA1, BA2 and BA3 and it is used to determine the weighted second deviation determined in each case for each evaluation variable in each mode of operation of the first selection in step S53.

The weighted second deviation 5e, 6e, 7e in each case represents a weighted deviation of the second ideal value 5d, 6d, 7d of the respective evaluation variable from the value of the respective evaluation variable 5b, 6b etc. at the operating point 2a of the determined ideal power distribution for the respective mode of operation.

Thus, for example, a value of 0 emerges for the weighted second deviation 5e of the "efficiency of the electric traction machine" operating variable in the BA2 mode of operation since the second ideal value 5b is identical to the value of the evaluation variable of this mode of operation. By contrast, a positive difference in value of the weighted second deviation 5e emerges for the BA3 mode of operation. Conversely, a value of 0 emerges, for example, for the weighted second deviation 7e of the BA3 mode of operation while the weighted second deviation 7e for the BA2 mode of operation results in a positive value, etc.

Subsequently, the ideal mode of operation is determined in step S54 using a second decision rule, according to which the modes of operation BA1, BA2 and BA3 are respectively evaluated in a manner dependent on the weighted second deviations 5e, 6e and 7e of the evaluation variables and an ideal mode of operation is set therefrom.

In the present case, it is not the previously applied minimax decision rule that is used as a decision rule. In accordance with the second decision rule, it is rather the case that the weighted second deviations 5e, 6e, 7e of the evaluation variables of respectively one mode of operation are summed, as a result of which the points Σ1, Σ2 and Σ3 emerge. Subsequently, the smallest one of these summed values is established, which corresponds to the value Σ2 in the present case. Then, the mode of operation which has the smallest of these summed values is set as ideal mode of operation 3. Therefore, the BA2 mode of operation is set as ideal mode of operation in the present case. The ideal mode of operation BA2, which corresponds to a load-point reduction, is therefore subsequently set as a current mode of operation by a control apparatus, wherein the ideal power distribution, previously determined in this mode of operation, in the form of the ideal E-machine torque of just over 200 Nm is predetermined as E-machine torque.

Subsequently, there is a new calculation of an ideal mode of operation 3 in the sequence of steps S2 to S5.

Although the invention has been described with reference to specific exemplary embodiments, it is clear to a person skilled in the art that various amendments can be carried out and that equivalents can be used as replacements without departing from the scope of the invention. Additionally, many modifications can be carried out without leaving the associated scope. Consequently, the invention should not be restricted to the disclosed exemplary embodiments but rather comprise all exemplary embodiments which fall under the scope of the attached patent claims. In particular, the invention also claims protection for the subject matter and the features of the dependent claims, independently of the claims referred to.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for selecting a mode of operation of a hybrid vehicle for current operation with respect to a predetermined target criteria with a corresponding ideal power distribution in a drivetrain selected from a predetermined set of possible modes of operation of a hybridized drivetrain, comprising:
   determining at least one evaluation variable for each predetermined target criteria for a quantitative description of each respective target criterion;
   determining possible power distributions in the drivetrain for each mode of operation of a first selection of possible modes of operation;
   determining values of the evaluation variables for each one of the determined possible power distributions for each mode of operation of the first selection;
   determining an ideal power distribution in the drivetrain by the determined values of the evaluation variables for the respective mode of operation;
   selecting an ideal mode of operation based at least in part on the determined evaluation variables for the modes of operation of the first selection, at a respective operating point of the determined ideal power distribution; and
   operating the hybrid vehicle at the selected ideal mode of operation at the respective operating point of the determined ideal power distribution.

2. The method according to claim 1, further comprising, for each mode of operation of the first selection the following steps are executed to determine the ideal power distribution for each mode of operation of the first selection:
   (a) determining a first ideal value of the evaluation variable for each evaluation variable in the respective mode of operation, wherein the first ideal value is one of:
   (a1) set as an extremal value of the determined values of the evaluation variable in the respective mode of operation when the target described by the evaluation variable is an extremization target, and
   (a2) predetermined as a setpoint value independent of the determined values of the evaluation variable in the respective mode of operation when the target described by the evaluation variable is an approximation target;
   (b) determining a weighted first deviations of the values of the respective evaluation variable for each evaluation variable from the determined first ideal value of the respective evaluation variable; and
   (c) determining the ideal power distribution of the respective mode of operation using a predetermined first decision rule, which sets an ideal power distribution depending on the determined weighted first deviations of the evaluation variables.

3. The method according to claim 2, further comprising, for selecting an ideal mode of operation from the first selection of possible modes of operation:
   (a) for each evaluation variable determining a second ideal value of the evaluation variable, which is valid for all modes of operation of the first selection, wherein the second ideal value is one of:
   (a1) set as an extremal value of the values of the respective evaluation variables at the operating point of the determined ideal power distribution in all modes of operation of the first selection when the target described by the evaluation variable is an extremization target, and
   (a2) predetermined as a setpoint value independent of the determined values of the respective evaluation variable if the target described by the evaluation variable is an approximation target;
   (b) determining a weighted second deviation, respectively determined for each evaluation variable in each mode of operation of the first selection and which respectively specifies a weighted deviation of the second ideal value of the respective evaluation variable from the value of the evaluation variables at the operating point of the determined ideal power distribution for the respective mode of operation;
   (c) selecting the ideal mode of operation using a predetermined second decision rule that evaluates the modes of operation of the first selection, in each case based at least in part on the weighted second deviations of the evaluation variables; and
   (d) setting an ideal mode of operation.

4. The method according to claim 3, further comprising:
   determining at least one weighting factor for each evaluation variable for determining at least one of:
   (a) the weighted first deviations that scales a difference in terms of magnitude of the values of the evaluation variables from the first ideal value of the respective evaluation variable to one of a dimensionless basis or a cost basis common to all evaluation variables; and
   (b) the weighted second deviations that scales a difference in terms of magnitude of the values of the evaluation variables from the second ideal value of the respective evaluation variable to one of the dimensionless basis or the cost basis common to all evaluation variables.

5. The method according to claim 4, wherein at least one of
   (a) the weighted second deviations of the evaluation variables of one mode of operation are summed and the mode of operation whose summed value of the summed second deviations is minimal is set as an ideal mode of operation;
   (b1) the first decision rule is a minimax decision rule and
   (b2) a largest first deviation is established at each operating point of the possible power distributions of one mode of operation from respective values of the weighted first deviations of the evaluation variables, and the operating point that has the smallest one of the established largest first deviations is set as ideal power distribution.

6. The method according to claim 2, wherein
   (a) values of the power distribution of the modes of operation that should be excluded as possible operating points are determined based at least in part on a predetermined exclusion criteria, and
   (b) for the purposes of determining the ideal power distribution for each mode of operation of the first selection, only those values of the possible power distribution and the respectively assigned values of the evaluation variables that are not excluded by the exclusion criteria are used.

7. The method according to claim 1, wherein determining the first selection of the modes of operation comprises:
  (a) predetermining at least one of: possible vehicle movement states of the hybrid vehicle, possible modes of operation of the drivetrain, and an assignment specifying which ones of the possible modes of operation are admissible in which vehicle movement state;
  (b) determining a current vehicle movement state; and
  (c) restricting the modes of operation of the vehicle to those that are assigned to the determined current vehicle movement state.

8. The method according to claim 7, wherein determining the first selection of the modes of operation comprises:
  (a) predetermining at least one restriction rule that sets which modes of operation are currently available depending on at least one operating parameter and independently of a current torque requirement and the current vehicle movement state; and
  (b) restricting modes of operation of the vehicle to those that are currently available in accordance with the at least one restriction rule.

9. The method according to claim 8, wherein, in accordance with the at least one restriction rule, an availability of components in the drivetrain is checked.

10. The method according to claim 9, wherein in accordance with the at least one restriction rule, the components in the drivetrain comprise an electric energy store and an electric traction machine.

11. The method according to claim 1, wherein at least one of:
  (a) the vehicle is a parallel hybrid vehicle; and
  (b) the power distributions in the drivetrain that are possible for each mode of operation are established as the torques generable by the electric traction machine, based at least in part on capabilities of the components in the drivetrain; and
  (c) an ideal power distribution is determined by a torque of an electric traction machine which is ideal in respect of the predetermined target criteria.

12. The method according to claim 1, wherein the possible modes of operation of the drivetrain comprise one or more of: pure combustion-engine-related travel, pure electric travel with the combustion engine switched off, electric travel with the combustion engine operating at idle speed, boost operation, brake recuperation, electric start, load-point increase, load-point reduction, and genset operation.

13. A hybrid vehicle, comprising a control apparatus configured to select a mode of operation of the hybrid vehicle configured to carry out a method comprising:
  determining at least one evaluation variable for each predetermined target criteria for a quantitative description of a respective target criterion;
  determining possible power distributions in the drivetrain for each mode of operation of a first selection of possible modes of operation;
  determining values of the evaluation variables for each one of the determined possible power distributions for each mode of operation of the first selection;
  determining an ideal power distribution in the drivetrain by the determined values of the evaluation variables for the respective mode of operation;
  selecting an ideal mode of operation based at least in part on the determined evaluation variables for the modes of operation of the first selection, at a respective operating point of the determined ideal power distribution; and
  operating the hybrid vehicle at the selected ideal mode of operation at the respective operating point of the determined ideal power distribution.

* * * * *